Dec. 10, 1935.  W. H. COLGATE  2,024,091
MATCH BOOK DISPLAY PACKAGE
Filed Jan. 17, 1933  4 Sheets-Sheet 1

INVENTOR.
William Homer Colgate
BY Redding, Greeley, O'Shea & Campbell
ATTORNEYS.

Dec. 10, 1935.  W. H. COLGATE  2,024,091
MATCH BOOK DISPLAY PACKAGE
Filed Jan. 17, 1933  4 Sheets-Sheet 2
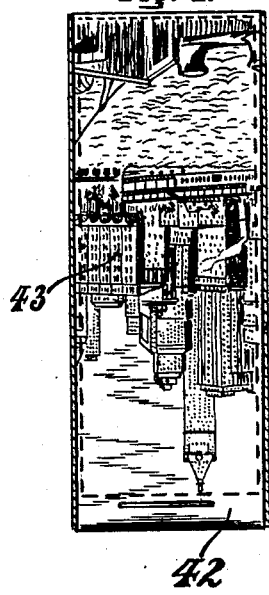
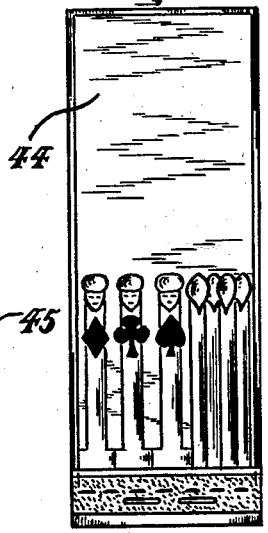
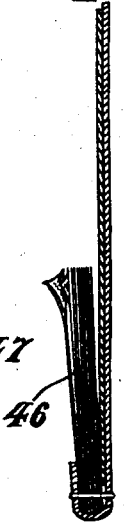
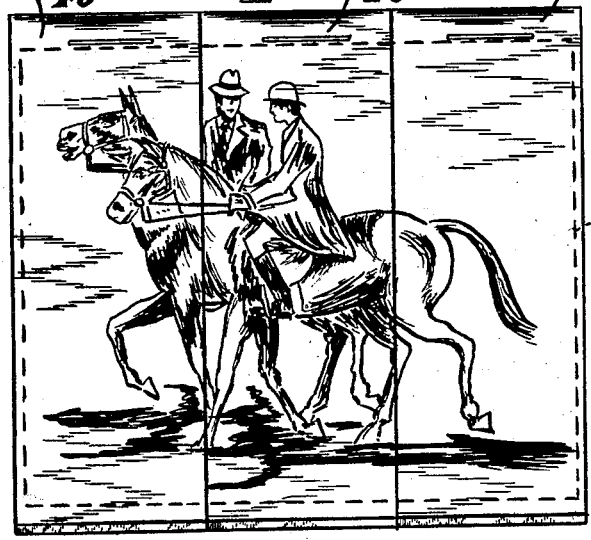
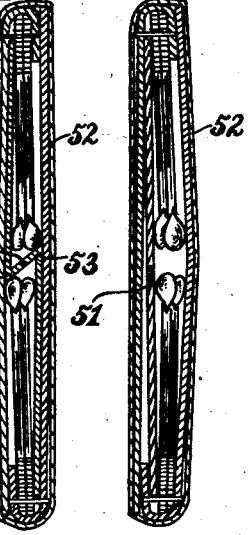
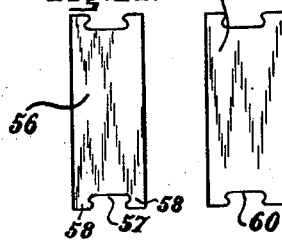
INVENTOR.
William Homer Colgate
BY
Redding, Greeley, O'Shea & Campbell
ATTORNEYS.

Dec. 10, 1935.  W. H. COLGATE  2,024,091
MATCH BOOK DISPLAY PACKAGE
Filed Jan. 17, 1933  4 Sheets-Sheet 3
Fig. 17.  Fig. 18.  Fig. 19.  Fig. 20.
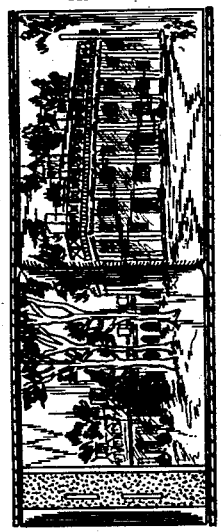
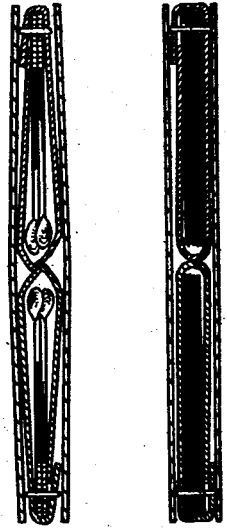
Fig. 21.  Fig. 27.
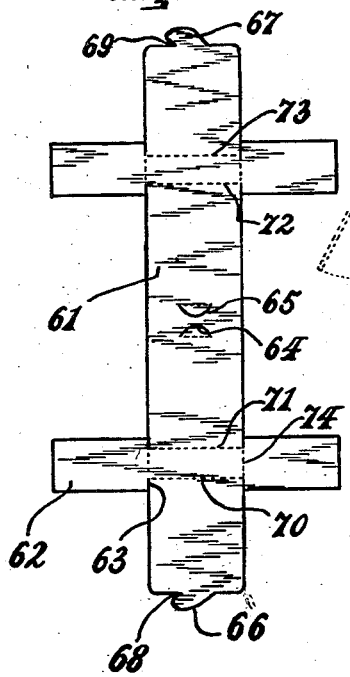
Fig. 22.  Fig. 23.  Fig. 25.
Fig. 24.  Fig. 26.
INVENTOR.
William Homer Colgate
BY
Redding, Greeley, O'Shea & Campbell
ATTORNEYS.

Dec. 10, 1935.                W. H. COLGATE                2,024,091
                        MATCH BOOK DISPLAY PACKAGE
                    Filed Jan. 17, 1933        4 Sheets-Sheet 4
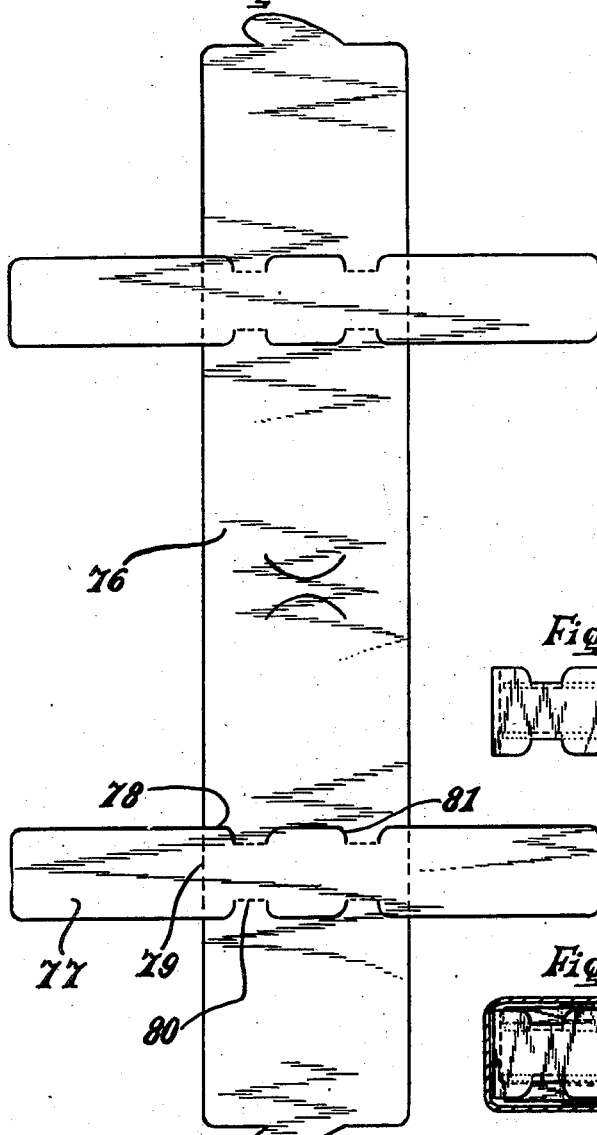
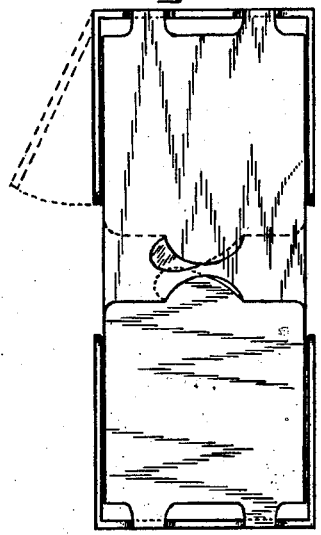
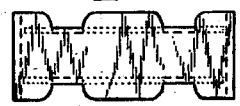
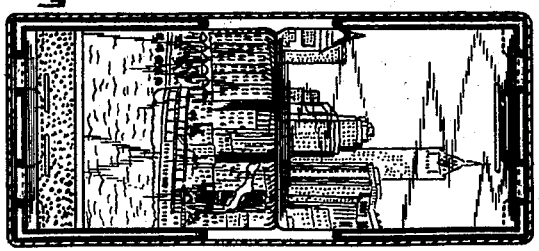
INVENTOR.
William Homer Colgate
BY Redding, Greeley, O'Shea & Campbell
ATTORNEYS.

Patented Dec. 10, 1935

2,024,091

UNITED STATES PATENT OFFICE 2,024,091

MATCH BOOK DISPLAY PACKAGE

William Homer Colgate, Larchmont, N. Y.

Application January 17, 1933, Serial No. 652,136

7 Claims. (Cl. 206—44)

The present invention relates to match book display packages and the like and embodies, more specifically, an improved package construction for match books and like objects wherein the covers of such books are adapted to be folded over the contents thereof and tucked under a flap in service. More particularly, the invention comprises an improved package construction for match books and the like wherein the covers of the books have thereon indicia extending over substantially the entire outer surface of the cover, the package being of such nature that the entire indicia on the book may be displayed in an effective manner.

In dispensing match books it has been found that the sales appeal and demand therefor is greatly increased by inscribing artistic and fanciful indicia upon the outer surface of the covers of such books. Such indicia heretofore have been displayed upon the covers of match books by applying the completed motive upon either the outer front or back surface of the cover or upon both. The size and shape of the front and back surfaces of the cover of a match book definitely limits the nature of the indicia which can be applied thereto. If the entire outer surface of the cover of a match book is filled with indicia of a single motive, the display thereof in folded form inadequately shows the character of the indicia and thus definitely limits the sales appeal thereof.

In order that match books may be provided having the outer surface of the cover thereof provided with indicia extending over substantially the entire surface thereof and displayed in an attractive manner, the present invention has been designed and an object thereof is to provide a match book display package wherein the complete indicia upon the outer surface of the cover of the match book is available for display purposes.

A further object of the invention is to provide a display package for match books upon the outer surface of the covers of which indicia has been applied, the package being of such nature as to maintain the combustible contents of the book in a safe and definitely spaced relation to the abrasive surface for igniting the match.

A further object of the invention is to provide a display package for match books and the like wherein the cover of the match book is provided with indicia over substantially the entire surface thereof, means being provided to maintain the cover in an extended position to facilitate the display of the indicia thereon.

A further object of the invention is to provide a display package for match books, the covers of which are provided with indicia over substantially the entire surface thereof wherein means is provided to maintain the covers in extended position and preserve the contents of the books in a desired protected condition.

A further object of the invention is to provide a display package for match books wherein a principal display card or other indicia bearing element is utilized to support a plurality of match or other books having covers adapted to be folded thereover in such position that the covers may be maintained in an extended position to position the indicia thereof, such indicia bearing a relation to the indicia upon the principal display member.

A further object of the invention is to provide a display package for match books and the like wherein a plurality of books are adapted to be positioned side by side and the covers of such books provided with indicia which cooperate to form a composite picture or complete indicia.

Further objects, not specifically enumerated above, will be apparent as the invention is described in greater detail in connection with the accompanying drawings, wherein:

Figure 7 is a plan view showing a modified form of the invention wherein a single match book or other device is mounted with its cover in extended relation, the cover bearing suitable indicia inscribed over substantially the entire outer surface thereof.

Figure 8 is a view looking from the opposite direction from which Figure 7 is looking showing the manner in which the contents of the book may be effectively displayed by the construction shown in Figure 7.

Figure 9 is a view similar to Figure 8, showing the book construction used with contents other than the matches of Figure 8.

Figure 10 is a view in transverse section showing the structure of Figure 9.

Figure 11 is a plan view showing a display package for match books and the like wherein a plurality of books are spaced side by side and the covers thereof maintained in extended position, each cover being provided with indicia which, when assembled, comprises a portion of a composite indicia formed by the association of all of the indicias.

Figure 12 is a transverse view in section, showing one form of display package construction illustrated in Figure 11.

Figure 13 is a view similar to Figure 12, showing a modified form of display package in accordance with Figure 11.

Figure 14 is a detail view in smaller scale showing a reinforcing member constructed in accordance with the present invention and adapted to support one or more match books in an extended display position.

Figure 15 is a plan view of a reinforcing member constructed in accordance with the structure shown in Figure 14 but formed to receive and mount a plurality of match books in side by side relationship.

Figure 16 is an enlarged detail view in section showing the manner in which the supporting plate of Figures 14 and 15 is adapted to engage a match book or other device.

Figure 17 is a plan view of a package construction of modified form, constructed in accordance with the present invention, the wrapping being shown in section.

Figure 18 is a view of the package construction taken in the opposite direction from the view of Figure 17.

Figure 19 is a view in section, taken through the package construction shown in Figures 17 and 18.

Figure 20 is a view similar to Figure 19, showing a package containing material of a different nature from that shown in Figure 19.

Figure 21 is a developed plan view of a positioning web for use in facilitating the packaging of articles of irregular profile constructed in accordance with the present invention.

Figure 22 is a plan view of the positioning device of Figure 21 in assembled position.

Figure 23 is a side view of the device shown in Figure 22.

Figure 24 is an end view of the device shown in Figure 22.

Figure 25 is a plan view of a package formed with the positioning member shown in Figure 21, the articles positioned thereby being a book of matches.

Figure 26 is a view in end elevation showing the package of Figure 25, the wrapping thereof being illustrated in section.

Figure 27 is an enlarged view in side elevation showing the package of Figure 25 with the wrapping in section.

Figure 28 is a developed plan view of a modified form of positioning member.

Figure 29 is a view showing the positioning member of Figure 28 in assembled position.

Figure 30 is a view in end elevation showing the positioning member of Figures 28 and 29.

Figure 31 is a view in side elevation showing the positioning member of Figure 29.

Figure 32 is a view in end elevation showing the positioning member with articles mounted thereon to form a package, the wrapping of the package being illustrated in section.

Figure 33 is a plan view showing the package of Figure 32.

Figure 1:
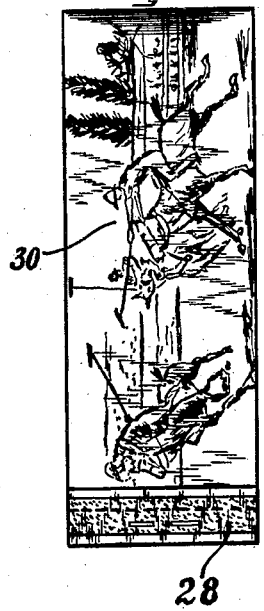
Figure 1 is a plan view of a display package for match books and the like, constructed in accordance with the present invention, the covers of the match books being provided with indicia over substantially the entire outer surface thereof.
Figure 2:
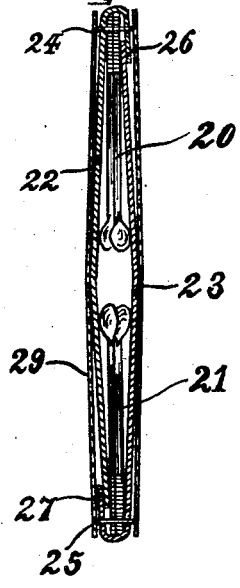
Figure 2 is a view in transverse section, taken through the match book package of Figure 1.

With reference to the above drawings, particularly Figures 1 and 2, the invention is illustrated as having been applied to two match books 20 and 21. Match book 20 is provided with a cover 22 and book 21 with a cover 23. The covers may be secured to the books by staples 24 and 25, respectively, or by any other suitable securing means. Turned back flaps 26 and 27 are formed on the respective covers 22 and 23, and upon these flaps an abrasive 28 may be secured in a well known manner.

The foregoing construction is in accordance with common practice and constitutes no part of the present invention. The display package of the present invention, however, includes the combination of two or more such match books with their covers in extended position and mounted face to face, as shown in Figure 2, with the contents of the books extending in opposite directions and the books retained in such position by suitable friction means which, in the construction shown in Figure 2, is formed by the end of the covers 22 and 23 when inserted under the flaps 27 and 26, respectively. In such position, the combustible match heads are effectively maintained in spaced position with respect to the transverse igniting substance 28. A wrapping 29 of cellophane or other transparent or translucent substance is provided over the books and the outer surface of the books is provided with indicia 30, as illustrated in Figure 1. The indicia 30 covers substantially the entire outer surface of the covers of the books and such indicia is thus displayed in an effective and attractive manner.

Figure 3:
Figure 3 is a plan view similar to Figure 1, showing a modified form of display package wherein a stiffening member is provided to maintain the match books in spaced relation in order that the entire outer surface of the covers of the books may be effective for display purposes.
Figure 4:
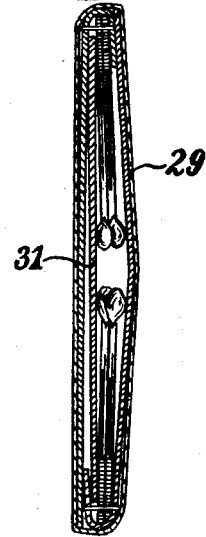
Figure 4 is a transverse view in section showing the elements of the package of Figure 3.

In the construction shown in Figures 3 and 4, the books 22 and 23 are positioned as shown in Figure 2, to the ends of the extended covers which are not tucked under the flaps 26 and 27, as in the construction shown in Figure 2 but a spacing and positioning member 31 is provided to engage frictionally between the matches and the cover and flap at one side of the books. This spacing member 31 effectively maintains the books in such position as to prevent contact between the combustible substance of the match heads and the abrasive strip upon flaps 26 and 27 and the entire outer surface of the covers is thus available for display purposes.

Figure 5:
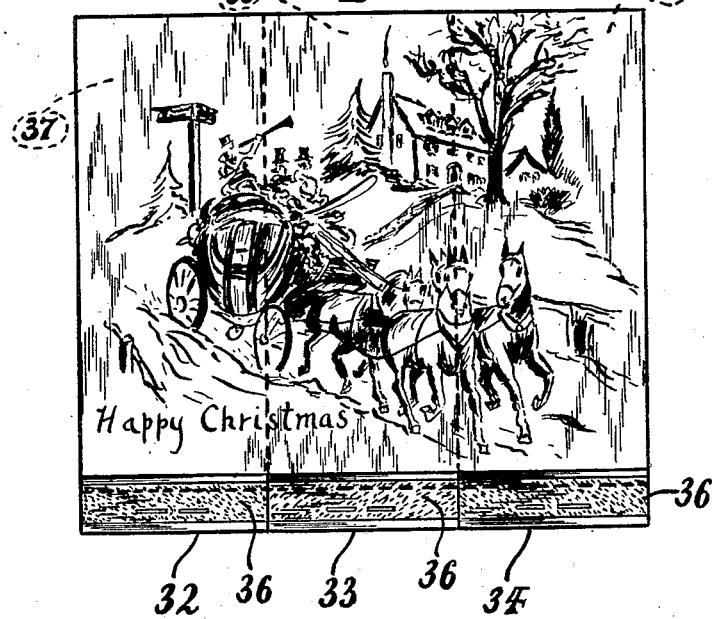
Figure 5 is a plan view showing a modified form of the invention wherein a plurality of match books are mounted side by side upon an element bearing a principal indicia, the backs of the match books being provided over substantially the entire outer surface thereof with indicia bearing a suitable relation to the indicia upon the principal element.
Figure 6:
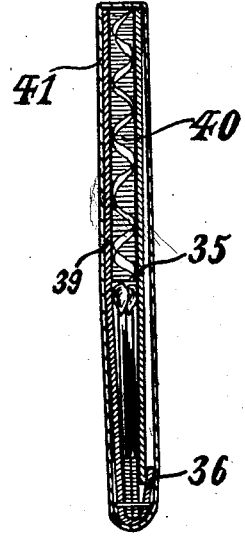
Figure 6 is a view in transverse section showing the elements of Figure 5.

In the construction shown in Figures 5 and 6 a plurality of books 32, 33, and 34 are spaced side by side and positioned by a card or other principal indicia bearing member 35 which may engage under the abrasive bearing flaps 36 of the several books. The covers 37, 38, and 39 of the respective books are maintained in an extended position and a spacing member 40 may be provided to cooperate with the contents of the books to form a substantially symmetrical package, the indicia upon the outer surface of the covers of the books 32, 33, and 34 preferably being similar to or bearing a relation to the indicia upon the principal indicia bearing member 35. The entire package is preferably wrapped in a transparent or semi-transparent covering 41 in order that the indicia upon the covers and member 35 may be effectively displayed.

With reference to the construction shown in Figures 7 and 8, a match book 42 is provided with indicia 43 over substantially the entire surface thereof, a spacing or reinforcing member 44 being inserted between the cover and the contents of the book to be engaged therebetween frictionally. The contents of the book (in Figure 8, illustrated as matches) may be designed or decorated in a fanciful fashion and the reinforcing member 44 may also be provided with suitable indicia, the entire being wrapped with a transparent or semi-transparent wrapping 45 in order that the indicia may be effectively displayed.

In the construction shown in Figures 9 and 10 the book is shown as being formed of a plurality of sheets of tissue 46 which may bear suitable indicia 47. This, of course, follows the inventive concept of the construction shown in Figures 7 and 8.

In the construction shown in Figure 11, a plurality of books 48, 49, and 50 are spaced side by side with the covers thereof in extended position and placed against a similar number of books in face to face relationship. The cover of each book on one side of the resulting package is provided with indicia which, cooperating with the indicia on the remainder of the books upon the same side of the package, forms a composite indicia of a single motive. A strengthening or reinforcing member 51 is secured frictionally between the flaps and covers and the contents of the respective books, in order that the same may be maintained in a desired position, as shown in Figure 11. Figure 13 shows the manner in which these elements are assembled and a wrapping 52 of transparent or semi-transparent material is provided to maintain the covers in a suitable display position, the ends thereof lying over the flaps of cooperating books, as illustrated in the drawings.

In the construction shown in Figure 12, the positioning member 51 is formed with two creases 53 and 54, between which an intermediate section 55 of the reinforcing member 51 lies. This intermediate portion 55 positively spaces the contents of the books and, when engaged by the latter, forces the ends of the spacing member 51 into effective frictional engagement between the contents of the books and the covers thereof.

Figure 14 illustrates a modified reinforcing member which is adapted to be substituted for the member 44 shown in Figures 4, 7, 8, 9, and 10. This member 56 is formed with notches 57 which are adapted to receive the staples of the respective books in order that the shoulders 58, forming the notches 57, may move beyond the staples of the books and engage the movements thereof to serve, more effectively, as a strengthening and positioning member.

Figure 16 is an enlarged detailed view in section, showing the manner in which this improved strengthening member engages a cooperating match book.

In the construction shown in Figure 15, a modified form of positioning member is shown, such member being illustrated at 59, as formed with a plurality of notches 60 in order that the member may be used in connection with a plurality of books, as shown in Figure 11. The particular advantage of the member 59 when used in connection with a plurality of books lies in the fact that the books are positively maintained in a desired side by side relationship, and thus cannot accidentally become displaced to detract from the appearance of the package.

Referring to Figures 17, 18, 19, and 20, a package is shown as formed of match books or similar objects positioned in such fashion that the indicia which is placed upon the entire cover of each book is displayed effectively by positioning the books in a package in such fashion that the uncompleted halves of the respective sides of the books may be displayed to form the completed indicia upon opposite sides of the package.

In the construction shown in Figures 21 through 27, a positioning member is illustrated which facilitates the convenient packing of articles of irregular profile such as books of matches, etc. This member consists of a strip of cardboard or similar material 61 having side flaps 62 spaced upon the sides thereof and formed with cuts 63. The strip 61 is cut at 64 and 65 to receive tabs 66 and 67, formed with notches 68 and 69 in order that the strip 61 may be folded, as illustrated in Figures 22 and 23. The strip 61 is scored at 70, 71, 72, and 73 to facilitate the folding of the strip into the form shown in Figures 22 and 23. Further scoring 74 is made at the portion of strip 61 to which flaps 62 are secured in order that the flaps may be folded against the sides of the positioning member as illustrated in Figures 22, 23, and 24. When the member has been formed and secured as illustrated in Figures 22 and 23, match books or other suitably shaped articles may be placed upon the sloping edges of the member as illustrated in Figures 25, 26, and 27 and a suitable wrapping 75 preferably of transparent nature may be applied thereto.

In the construction shown in Figures 28 through 33, a strip 76, similar to strip 61 is formed with side flaps 77, each of which is cut out from a portion of the body of strip 76, as illustrated at 78. Scores 79 are made in each flap to define the corners of the packages and scores 80 are formed in the strip 76 to facilitate the folding of the strip into the form shown in Figures 29, 30, 31, 32, and 33. Cuts 81 are made in the strip 76 to form positioning flanges in order that the contents of the package may be effectively secured in position when placed upon the positioning member. The strip shown in Figure 28 is folded and locked in position in a manner similar to that described in connection with strip 61 shown in Figure 21.

It will thus be seen that an attractive and effective display package has been provided for match books and the like, the books being maintained in such relationship that the entire outer surfaces of the cover thereof are effective for display purposes and the contents thereof maintained in a definite spaced relationship. It will be understood that, where the term "sides" is used throughout the specification and claims, the term refers broadly to any side of the container, whether top, bottom, back, front or sides. Moreover, where the term "container" is used, the term applies either to the actual container in which contents are received, or to any wrapping or cover for such container, where a wrapper or cover may be found desirable in addition to the actual physical container.

While the invention has been described with specific reference to the accompanying drawings, it is not to be limited, save as defined in the appended claims.

I claim as my invention:

1. A positioning member comprising a strip scored for folding at four spaced points to form four corners when assembled, the ends and intermediate portion of the member being formed with means to secure the ends to the intermediate portions, the ends being secured at opposite sides of the intermediate portion.

2. A positioning member comprising a strip scored for folding at four spaced points to form four corners when assembled, the ends and intermediate portion of the member being formed with means to secure the ends to the intermediate portions, the ends being secured at opposite sides of the intermediate portion, the member being formed with flaps serving as side positioning flaps.

3. A positioning member comprising a strip scored for folding at four spaced points to form four corners when assembled, the ends and intermediate portion of the member being formed with means to secure the ends to the intermediate portions, the member being cut and formed with flaps serving as corner and side positioning flaps and cut to form end flanges at each scoring.

4. A package of containers for matches and the like each container having a cover adapted to be folded over the contents and tucked under a closing flap, each of said containers having indicia upon substantially the entire outer surface of the cover, the package comprising a plurality of containers spaced with the folds of the covers adjacent each other and the closing flaps of the containers extending in opposite directions from the median line, whereby substantially the complete indicia on the containers may be viewed from both sides of the package, and means to hold the containers in said spaced relation.

5. A package of containers for matches and the like each container having a cover adapted to be folded over the contents and tucked under a closing flap, thus forming front and rear cover portions, the front cover portion of each container having indicia upon the outer surface thereof and the rear cover portion of each container also having indicia upon the outer surface thereof, the package comprising a plurality of containers spaced in abutting relationship whereby the indicia upon the front and rear cover portions of the plurality of containers cooperate to form a complete indicia, and means to hold the containers in said spaced relationship.

6. A package formed of a plurality of containers each of which includes a cover under which the contents of the container are received, the cover having front and rear portions, the front cover portion of each container having indicia upon the outer surface thereof and the rear cover portion of each container also having indicia upon the outer surface thereof, the package comprising a plurality of containers spaced in abutting relationship whereby the indicia viewed from at least one side of the package and formed upon the front and rear cover portions of a plurality of the containers cooperate to form substantially the complete indicia on the containers which may be viewed from either or at least one side of the package, and means to hold the containers in spaced relationship.

7. A package formed of a plurality of containers in which contents are received, the package, as viewed from at least one side thereof, displaying an artistic composition formed by indicia upon sides of the containers, each container having a plurality of sides two or more of which sides have indicia upon the outer surfaces thereof, the indicia of corresponding sides of a plurality of the containers being substantially identical, the package including a plurality of substantially identical containers spaced in abutting relationship, the said plurality of substantially identical containers being positioned so that different or non-corresponding sides of each are in abutting display relationship, whereby the indicia of the said plurality of identical containers viewed from at least one side of the package and formed upon the said plurality of identical containers cooperate to form at least a portion of the artistic composition formed by the displayed indicia on the containers which may be viewed from at least one side of the package, and means to hold the containers in spaced relationship.

WILLIAM HOMER COLGATE.